United States Patent [19]
Kobayashi et al.

[11] Patent Number: 5,746,893
[45] Date of Patent: May 5, 1998

[54] METHOD OF MANUFACTURING MAGNETIC RECORDING MEDIUM

[75] Inventors: Masato Kobayashi; Osamu Nozawa, both of Tokyo; Hisao Kawai, Yamanashi; Keiji Moroishi, Yamanashi; Takashi Sato, Yamanashi; Junichi Horikawa, Yamanashi, all of Japan

[73] Assignee: Hoya Corporation, Tokyo, Japan

[21] Appl. No.: 575,019

[22] Filed: Dec. 19, 1995

[30] Foreign Application Priority Data

Dec. 19, 1994 [JP] Japan .................................. 6-333788
Jun. 28, 1995 [JP] Japan .................................. 7-161942

[51] Int. Cl.⁶ ............................................. C23C 14/34
[52] U.S. Cl. ............................ 204/192.2; 204/298.25
[58] Field of Search ............................... 204/192.2

[56] References Cited

U.S. PATENT DOCUMENTS

| 4,880,514 | 11/1989 | Scott et al. | 204/192.2 |
| 5,057,200 | 10/1991 | Lal et al. | 204/192.15 |
| 5,063,120 | 11/1991 | Edmondson et al. | 428/694 |
| 5,078,846 | 1/1992 | Miller et al. | 204/192.2 |
| 5,227,212 | 7/1993 | Ahlert et al. | 360/97.01 |
| 5,244,554 | 9/1993 | Yamagata et al. | 204/192.2 |
| 5,397,644 | 3/1995 | Yamashita | 428/408 |

FOREIGN PATENT DOCUMENTS

| 0 330 356 | 8/1989 | European Pat. Off. . |
| 0 388 088 | 9/1990 | European Pat. Off. . |
| 0 440 259 | 8/1991 | European Pat. Off. . |

OTHER PUBLICATIONS

Patent Abstracts of Japan, JP-6020321, vol. 18, No. 235, dated Apr. 28, 1994.

*Primary Examiner*—Aaron Weisstuch
*Attorney, Agent, or Firm*—Sughrue, Mion, Zinn, Macpeak & Seas, PLLC

[57] ABSTRACT

A method of manufacturing a magnetic recording medium by using an in-line sputtering apparatus to successively form, on a substrate, at least one underlying layer, a first magnetic CoPt-based film, a nonmagnetic intermediate film, and a second magnetic CoPt-based film. The underlying film and/or the nonmagnetic film, which are in contact with the first magnetic film, are deposited at a low sputtering power between 100 and 1000 watts to improve the magnetic properties of the magnetic recording medium. Low power sputtering is also effective to improve the distribution of difference of the crystal lattice spacings between the nonmagnetic intermediate film and the first magnetic film and between the underlying layer and the first magnetic film.

19 Claims, 3 Drawing Sheets

METHOD OF MANUFACTURING MAGNETIC RECORDING MEDIUM

BACKGROUND OF THE INVENTION

The present invention relates to a method of manufacturing magnetic recording media, such as magnetic disks and magnetic tapes.

Magnetic recording technology has a long history and is based on established techniques. The development of an information-based society in recent years has accelerated the development of magnetic recording media of higher density with improved properties. Such technology has become more and more important.

In particular, a thinner recording layer has been used for higher recording density in the field of magnetic disks (e.g., hard disks and floppy disks) used as peripheral storage devices. The Age of Thin Film Media using a magnetic thin film has begun. Important challenges are how to ensure the reliability of data stored thereon with a higher recording density and how to make such media suitable for mass-production at a low manufacturing cost.

One of the thin film recording layers meeting such requirements consists of a magnetic layer of a cobalt-platinum (CoPt) based alloy having a high coercive force, which is divided into two magnetic films by a nonmagnetic layer of chromium (Cr) for the reduction of noise during reproduction. More specifically, the resultant medium is formed from a magnetic CoPt film, a nonmagnetic Cr film, and another magnetic CoPt film in this order. It is also known that an underlying layer of Cr provides a favorable crystalline structure for the magnetic CoPt film when placed under the thin film recording layer (as disclosed in Japanese Patent Laid-Open No. 2-210614).

However, the above-mentioned magnetic recording medium with the underlying Cr layer, magnetic CoPt film, nonmagnetic Cr film, and magnetic CoPt film placed in this order exhibits insufficient or unsatisfactory properties for a recording medium, such as coercive force, reproduction output voltage of a magnetic head (product of residual magnetization and film thickness of the magnetic layer), and signal-to-noise ratio when it is manufactured with an in-line sputtering apparatus.

In addition, it has been found that the magnetic recording medium having the above-mentioned structure which is called a double layer structure, shows coercive force in comparison with a single magnetic layer and shows poor overwriting properties.

On the other hand, it is known that a higher coercive force can be achieved by using chromium as the underlayer of the magnetic layer, such as CoNiCr alloy or CoCrTa alloy (see, for example, IEEE Transactions on Magnetic, Vol. MAG-3, No. 3 (1967), pages 205–207).

However, the magnetic CoPt alloy layer causes poor orientation of C-axis of h.c.p. structure when only chromium (Cr) is used as an underlayer. This is because the lattice constant of the magnetic CoPt-based alloy layer is larger than the crystalline lattice constant of the conventional magnetic layer of the CoNiCr alloy or the CoCrTa alloy. As a result, the magnetic CoPt-based layer is not completely matched in atomic alignment with the underlying layer of the single component of Cr. This badly affects the orientation of the C-axis.

In order to overcome this problem, U.S. Pat. No. 4,652,499 proposes to add a second or different metal to the Cr underlayer to improve the lattice constant. The orientation along the C-axis can be improved for the magnetic layer in a film interface or boundary by means of changing the lattice constant of the alloy underlayer by addition of the different metal to the Cr alloy.

The present inventors have found, as a result of detailed consideration, that the resultant recording medium has a significantly larger noise as a result of the addition of the different metal to the underlying Cr layer.

SUMMARY OF THE INVENTION

An object of the present invention is to provide a method of manufacturing a magnetic recording medium which has improved properties, such as coercive force, reproduction output voltage of a magnetic head and signal-to-noise ratio.

Another object of the present invention is to provide a method of manufacturing a magnetic recording medium which has good over-writing properties and which can reduce noise.

It is yet another object of the present invention to provide a magnetic recording medium and a method of manufacturing the magnetic recording medium which has two or more magnetic CoPt-based alloy layers separated from each other by a nonmagnetic intermediate layer.

In order to achieve the above-mentioned objects, the present inventors have made a great number of studies. As a result, it was found that the coercive force and the signal-to-noise ratio are deteriorated due to the contamination of $H_2O$, $O_2$, and/or $N_2$ into the nonmagnetic Cr layer which are adhered to a shield plate or a substrate holder (pallet) that is moved towards and between targets during the deposition of the nonmagnetic Cr layer when an in-line sputtering apparatus is used. In addition, it was also found that use of the in-line sputtering apparatus deteriorates the film performance of the nonmagnetic layer, and in turn deteriorates the film performance of the magnetic CoPt layer formed on the nonmagnetic layer.

Further studies showed that impurities can be reduced in the nonmagnetic layer when the in-line sputtering apparatus is driven at low power. This shows that the resultant nonmagnetic layer has good film performance, which improves the magnetic CoPt layer formed on the nonmagnetic layer.

The inventors' experimental studies have been conducted to search for an optimum material which is suitable for the nonmagnetic layer and which can be deposited by sputtering at low power within the in-line apparatus. The studies indicated that a Cr alloy as the nonmagnetic layer can achieve a higher recording density by the use of a relatively thin film thickness with necessary coercive force maintained and that the resultant magnetic recording medium has superior properties including a superior coercive force and signal-to-noise ratio. In other words, it was found that when the nonmagnetic film of the Cr alloy is continuously deposited along with the magnetic films on both sides thereof within the in-line sputtering apparatus, the resultant nonmagnetic Cr alloy film has a better film performance and serves to form a magnetic recording medium having superior properties such as the coercive force. In brief, it was found that the combination of the nonmagnetic Cr alloy film and the in-line sputtering makes it possible to manufacture a magnetic recording medium having superior properties.

This applies to the relationship between the underlying Cr layer and the magnetic CoPt layer in contact with the underlying layer. The present invention was thus completed.

More specifically, a method of manufacturing a magnetic recording medium according to the present invention comprises the steps of successively depositing, on a substrate, at least one or more underlying layers and a magnetic layer of a CoPt-based alloy, a nonmagnetic film of a Cr-based alloy, and a magnetic layer of CoPt-based alloy. The method further comprises the step of depositing the underlying layer and/or non-magnetic film which are brought into contact with the magnetic layer at a low power range between 100 and 1000 watts.

Furthermore, the present inventors have experimented with various magnetic record media. In a magnetic recording medium having two or more magnetic CoPt-based alloy layers divided by a nonmagnetic intermediate layer, the coercive force and the over-writing properties were degraded in dependency upon the composition of the film material and deposition conditions for the film formed between the magnetic layers. It was also found that when the CoPt-based alloy is used for the magnetic layer, the noise of the medium can be reduced without seriously affecting the coercive force and the over-writing properties. This serves to reduce the difference between the crystal lattice spacing of the (002) plane of the magnetic CoPt-based alloy layer and the crystal lattice spacing of the (110) plane of the underlying nonmagnetic Cr alloy layer deposited just beneath that magnetic layer, when an alloy based on Cr and Mo is used for the nonmagnetic intermediate layer separating the magnetic layer.

In the course of the examinations of the present inventors, it has been confirmed by a transmission electron microscope that addition of a different metal (e.g., Mo) to the underlying Cr layer causes various particle sizes of crystals to grow and deteriorates the formation of crystals. More specifically, growth of the magnetic CoPt-based alloy layer (such as CoPtCr), laminated on the underlying Cr alloy layer, is adversely affected by the particle sizes and the non-uniformity of the crystals in the underlying layer. In other words, the non-uniformity of the particle sizes of the crystals in the underlying layer results in non-uniformity of the crystals in the magnetic layer. It has been confirmed that such non-uniformity in the magnetic layer gives rise to an increase of noise in the magnetic recording medium.

Considering the above, a second underlying film was laminated on an underlying layer or film which is formed by crystals having uniform particle sizes and good crystallinity. In this case, the second underlying film was formed by a Cr alloy of Cr and a different metal. The underlying layer of two films was, however, not enough for noise reduction of the medium.

With this knowledge, the present inventors made further examinations and studies. It was found that the noise of the medium can be remarkably reduced by adjusting or controlling the difference between the crystal lattice spacing of the (002) planes of the magnetic CoPt-based alloy layer and the crystal lattice spacing of the (110) planes of the underlying Cr alloy (the combination of Cr and the different metal added thereto) film which provides an uppermost layer or surface of the underlying layer. IN other words, the coercive force and angle ratio can be improved and the noise of the medium reduced by decreasing the difference between the crystal lattice spacing of the (002) planes of the magnetic CoPt-based alloy layer and the crystal lattice spacing of the (110) planes of the uppermost Cr alloy film.

It is not necessarily optimum that there is no difference between the crystal lattice spacing of the (002) planes of the magnetic CoPt-based alloy layer and that of the (110) planes of the underlying Cr alloy film or the Cr alloy intermediate film. Various experiments and examinations indicated that a small difference is preferable in view of the reduction of the noise. More specifically, control of the C-axis orientation of the magnetic layer within a certain range results in a reduction of the noise of the medium. The deposition at low sputtering power serves to adjust the crystal lattice spacing of the (002) planes of the magnetic CoPt-based alloy layer to that of the (110) planes of the underlying Cr alloy layer.

According to another aspect of this invention, a method is provided for use in manufacturing a magnetic recording medium which includes a magnetic layer. The magnetic layer comprises first and second magnetic films each of which essentially comprises Co and Pt and a nonmagnetic intermediate film which is interposed between the first and the second magnetic films and which essentially comprises Cr and Mo. Each of the first and the second magnetic films is characterized by a hexagonal close-packed (hcp) crystal structure having (002) planes remote from each other by a first crystal lattice plane spacing $d_{(002)}$ while the nonmagnetic intermediate film is characterized by a body-centered cubic (bcc) crystal structure having (110) planes distant from each other by a second crystal lattice plane spacing $d_{(110)}$. The method comprises the step of successively depositing the nonmagnetic intermediate film and the second magnetic film at low power such that the difference between the first crystal lattice plane spacing $d_{(002)}$ and the second crystal lattice plane spacing $d_{(110)}$ falls within a range between 0.002 and 0.032 angstrom.

DESCRIPTION OF PREFERRED EMBODIMENTS

The present invention will be described in detail hereinunder.

Figure 1:
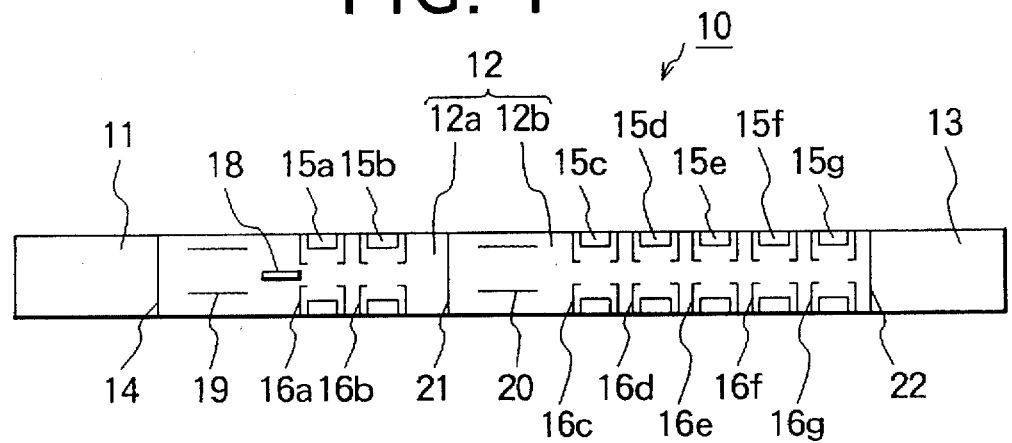
FIG. 1 is a plane view of an in-line sputtering apparatus for magnetic disks, which is used to achieve the method of manufacturing a magnetic recording medium according to the present invention.

A magnetic recording medium according to a first embodiment of the present invention is manufactured by using an in-line sputtering apparatus 10 illustrated in FIG. 1.

The in-line sputtering apparatus 10 comprises a pallet load chamber (loadlock chamber) 11, a sputtering chamber (vacuum chamber) 12, and a pallet unload chamber (loadlock chamber) 13, all of which are connected in line with one another through partitioning plates 14, 21 and 23. Briefly stated, pallets are fed from the pallet load chamber 11 to the sputtering chamber 12, where multiple layers are deposited successively on a substrate. The pallets are transferred from the sputtering chamber 12 to the pallet unload chamber 13. This apparatus is of a loadlock type and therefore carries out continuous operation without exposing the sputtering chamber 12 to the air.

Pairs of targets 15a through 15g of predetermined materials are arranged in a predetermined order within the sputtering chamber 12 so as to manufacture the magnetic recording medium. Shield plates 16a through 16g partially surround the pairs of targets 15a through 16g to avoid any adverse influence of plasma generated from the adjacent targets.

A d.c. magnetron method is used for the sputtering, and the optimum sputtering condition is achieved by controlling the magnetic field by the use of magnetron cathodes of plate shapes which have electromagnets.

Figure 2:
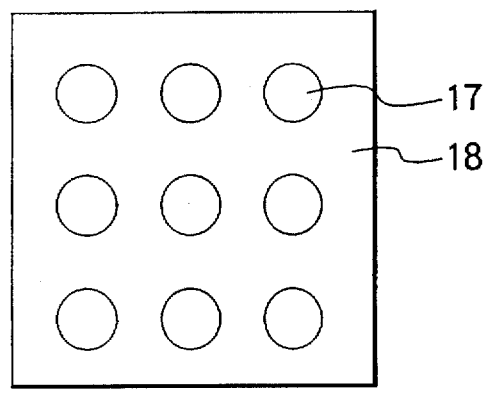
FIG. 2 is a front view of a pallet on which glass substrates are placed.

As shown in FIG. 2, an upright self-supporting pallet 18 which holds a plurality of substrates 17 is allowed to pass between the pairs of the targets 15a through 15g arranged on both side walls of the sputtering chamber 12. This movement of the pallet 18 enables simultaneous deposition of each film on both sides of each substrate 17.

Heaters 19 and 20 are provided for controlling the temperature of the substrate during the deposition. The temperature of the substrate 17 upon sputtering affects the coercive force and it is preferable that the heaters 19 and 20 are adjusted to 200° C. or higher during sputtering.

Properties of the Co alloy-based magnetic film deposited through the sputtering vary considerably, depending on the Ar gas pressure or the temperature of the substrate. Accordingly, control of these factors is important. Though it has not been determined exactly because it depends on the material used for the film, the Ar gas pressure upon sputtering preferably falls within a range between $1\times10^{-3}$ and $1\times10^{-2}$ Torr.

The in-line sputtering apparatus used for the present invention is not limited to the one illustrated in FIG. 1. It is apparent that the present invention can also be applied to any in-line sputtering apparatus (such as an in-line sputtering apparatus of other types used for magnetic disks or magnetic tapes) which have elements, such as the pallets and the shield plates, which are adjacent to the targets and which act as impurity sources.

In the present invention, a magnetic recording medium is manufactured by successively depositing, on the substrate, at least one or more underlying layers, a magnetic CoPt-based layer, a nonmagnetic Cr-based layer, and a magnetic CoPt-based layer within the above-mentioned in-line sputtering apparatus.

The substrate used may be, for example, a glass substrate, a crystallized glass substrate, a surface-reinforced glass substrate, an aluminum substrate, an aluminum alloy substrate, a ceramic substrate, a plastic substrate, a Si substrate, a Ti substrate, or a carbon substrate.

In the present invention, one or more underlying layers are deposited on the above-mentioned substrate with the in-line sputtering apparatus.

Figure 3A:
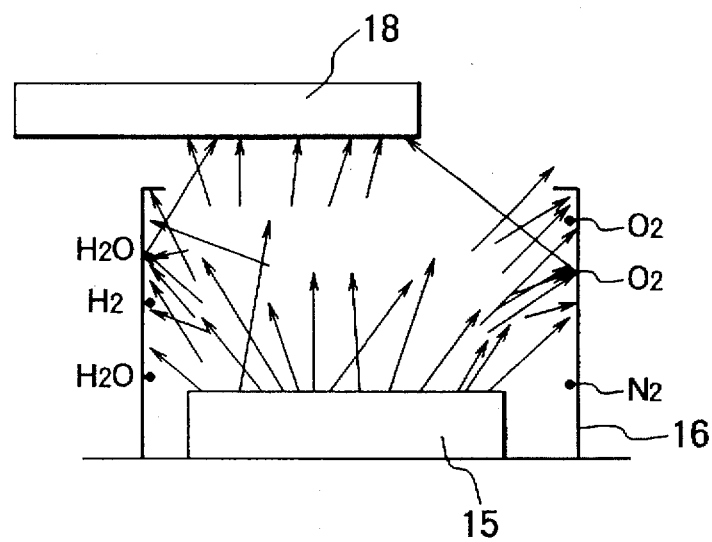
FIGS. 3(a) and (b) are views for use in describing the sputtering conditions around targets.
Figure 3B:
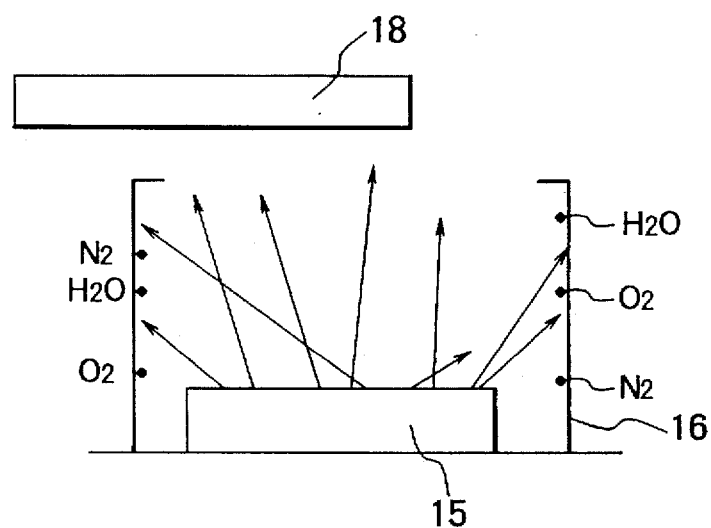

In this event, the underlying layer (the uppermost layer or the surface of the underlying layer) to be brought into contact with the magnetic layer is required to be deposited at a low sputter power. The reason will be described with reference to FIGS. 3(a) and 3(b). Herein, it is to be noted that FIGS. 3(a) and 3(b) show two views describing the sputtering conditions around a target 15 and a pallet 18. When underlying the layer which is to be brought into contact with the magnetic layer is deposited at low sputtering power, the particles emitted from the target 15 during sputtering have a high probability of reaching the substrate pallet 18 without being scattered, as shown in FIG. 3(b). As a result, the particles are decreased in number as compared to the case where sputtering is carried out at high sputtering power as shown in FIG. 3(a). In other words, a large amount of particles are emitted from the target 15 and scattered in various directions, as illustrated in FIG. 3(a), when the sputtering is carried out at high sputtering power. Accordingly, such low power sputtering makes it possible to reduce the amount of impurities, such as $H_2O$, $O_2$, and/or $N_2$, which are attached to the shield plate 16 and/or the pallet 18 and which are sputtered by the particles emitted from the targets to be directed to the underlying layer. The resultant underlying film includes a small amount of the impurities and therefore has excellent properties. This ensures favorable crystal growth of the magnetic film formed on the underlying layer and accomplishes improved magnetic properties such as the coercive force.

The crystal growth of the magnetic layer becomes poor if the underlying layer contacted with the magnetic layer is deposited at a sputtering power than 100 watts. On the other hand, sputtering power which is higher than 1000 watts brings about deterioration of the magnetic properties due to mixture of impurity gases into the underlying layer. The sputtering power is thus preferably selected within the range between 100 and 1000 watts. More preferably, the sputtering power may fall within a range from 300 to 700 watts. The sputtering currently density is preferably selected within the range from 0.9 to 10 $W/cm^2$ for the same reason.

As the sputtering power becomes low, the sputtering rate (deposition rate) becomes slow in proportion to the sputtering power. It might thus be considered that the sputtering rate also contributes to the improvement of the film properties or performance of the underlying layer. In this respect, the sputtering rate upon deposition of the underlying layer contacted with the magnetic layer may preferably be controlled within a range from 150 to 1500 angstroms/min., and more preferably from 450 to 1000 angstroms/min.

Herein, the underlying layer in contact with the magnetic layer is preferably formed by an alloy based on Cr. This is because the alloy based on Cr can obtain the coercive force that is required to achieve a high recording density with a relatively thin thickness. Therefore, such an underlying layer is not deteriorated in the magnetic properties, even when it is deposited in low sputtering power.

The layer of the alloy based on Cr, which serves as the underlying layer in contact with the magnetic layer, may have a film thickness between 10 and 100 angstroms in consideration of the magnetic properties of the resultant magnetic recording medium.

Such alloys based on Cr may be, for example, alloys of CrMo, CrV, and CrTa and other alloys containing, together with the above-mentioned alloys, one or two elements selected from the group consisting of Zr, W, B, Nb, Ta, Fe, Ni, Re, Ce, Zn, P, Si, Ga, Hf, Al, and Ti. Of these alloys, CrMo, CrV, CrMoZr, and CrTa alloys are very preferable because of remarkable improvements of magnetic properties. The content of elements other than Cr in the Cr-based alloy is typically around 10 at.%, taking into consideration the coherency of the magnetic layer lattice spacing.

The underlying layer may consist of two or more layers or film and will hereinunder be collectively called an underlying lamina. For example, a Cr layer may underlie the Cr-based alloy layer in contact with the magnetic layer. Alternatively, if a glass substrate is used, the underlying lamina may be composed of three layers successively formed on the glass substrate. Specifically, the underlying lamina may be composed of an Al layer, a Cr layer, and a Cr-based alloy layer.

The present invention, the magnetic layer is formed on the above-mentioned underlying lamina with the in-line sputtering apparatus and may consist of the magnetic CoPt-based film, the nonmagnetic Cr-based film, and the magnetic CoPt-based film.

In this event, the nonmagnetic Cr-based film is deposited at low sputtering power. This reason is similar to that mentioned in relation to the magnetic layer (magnetic film) and the underlying layer in contact with the above-mentioned magnetic layer. More particularly, the nonmagnetic film is deposited at low sputtering power to reduce the amount of impurities undesirably mixed into the underlying layer. The nonmagnetic film thus has a good film performance. This enables not only favorable crystal growth of the magnetic film formed on the nonmagnetic film but also improvement of magnetic properties, such as the coercive force.

As mentioned in conjunction with the underlying layer, the crystal growth of the nonmagnetic layer becomes poor if the nonmagnetic film is deposited at a sputtering power lower than 100 watts. On the other hand, a sputtering power of higher than 1000 watts results in deterioration of the magnetic properties due to undesirable mixture of impurity gases. The sputtering power is thus preferably selected within the range from 100 to 1000 watts. More preferably, the sputtering power falls within the range from 300 to 700 watts. The sputtering current density is preferably in the range of from 0.9 to 10 $W/cm^2$ for the same reason.

Like in the underlying layer, it is preferable that the nonmagnetic film is deposited at a deposition rate between 150 and 1500 angstroms/min., more preferably between 450 and 1000 angstroms/min.

The nonmagnetic film is preferably formed by an alloy based on Cr, like the underlying layer. This is because the alloy based on Cr enables obtainment of the coercive force which is required to achieve a high recording density with a relatively small film thickness. In addition, such a nonmagnetic film using an alloy based on Cr never deteriorates that magnetic properties even when the deposition is conducted at low sputtering power.

The nonmagnetic film of the alloy based on Cr may have a film thickness between 10 and 100 angstroms, taking into consideration the magnetic properties of the resultant magnetic recording medium.

Such alloys based on Cr may be, for example, alloys of CrMo, CrV, and CrTa and other alloys containing, together with the above-mentioned alloys, one or two elements selected from the group consisting of Zr, W, B, Nb, Ta, Fe, Ni, Re, Ce, Zn, P, Si, Ga, Hf, Al, and Ti. Of these alloys, CrMo, CrV, CrMoZr, and CrTa alloys are very preferable because of remarkable improvement of magnetic properties. The content of elements other than Cr in the Cr-based alloy is preferably determined in consideration of the coherency of the magnetic layer lattice spacing.

It is preferable that the total amount of Co and Pt in the magnetic CoPt-based film is equal to or greater than 70 (at.%) to provide sufficient coercive force. In addition, no limitation is imposed on the ratio between Co and Pt. However, it is preferable that the ratio Pt/Co (at.%) is in a range from 0.06 to 0.2 from the viewpoints of improving the coercive force, reducing the noise, and reducing costs.

Other components may be contained in addition to Co and Pt in the magnetic layer. For example, the magnetic layer may contain at least one element selected from the group consisting of Cr, Ta, B, O, N, Nb, Mn, Zn, W, Pb, Re, V, and Zr. Specifically, the magnetic layer may be formed by a CoPtCr alloy, a CoPtTa alloy, a CoPtCrB alloy, a CoPtCrTa alloy, or a CoPtCrNi alloy.

Each of the magnetic films separated by the nonmagnetic film may be formed either by the same material or a different material and may be either identical with or different from each other in thickness. In addition, the magnetic layer may have a plurality of magnetic films (e.g., five films) structured by alternative lamination of the nonmagnetic and magnetic films.

A protection layer and a lubrication layer are successively deposited on the above-mentioned magnetic layer.

The protective layer is formed on the magnetic layer for the purpose of protecting the magnetic layer from being destroyed due to contact operation of a magnetic head.

As the protection layer, a Cr layer, a Cr alloy layer, a carbon layer, a zirconium layer, or a silica layer can be used. The protection layer may be deposited successively along with the other layers, such as the magnetic layer, by the use of the in-line sputtering apparatus. The protection layer may have a single-film structure, or may have a plurality of films which may be formed either by the same material or by different materials.

Another protection layer may be stacked on the above-mentioned protection layer. For example, tetraalkoxysilane which is diluted with an alcoholic solvent is coated on the above-mentioned protection layer and is fired to form a silicon oxide ($SiO_2$) film which serves as another protection layer.

With this structure, the Cr layer or the like provides both shock resistance and chemical protection, while the $SiO_2$ layer provides both wear resistance and corrosion resistance.

The lubricant layer is formed on the protection layer so as to reduce frictional resistance between the magnetic head and a surface of the resultant medium. The lubricant layer may typically be applied in the following manner. A liquid lubricant of, for example, perfluoropolyether (PEPE) is prepared and diluted with, for example, a Freon-based solvent. Thereafter, the resultant lubricant is applied on the protection layer by the use of dipping, spin coating, or spraying technique. The coated film may be heated.

The present invention will be described more in detail below in conjunction with a set of examples and comparative examples, taking the above into account. Herein, it is to be noted that Examples exemplify the magnetic recording medium according to the above-mentioned embodiment.

EXAMPLE 1

Figure 4:
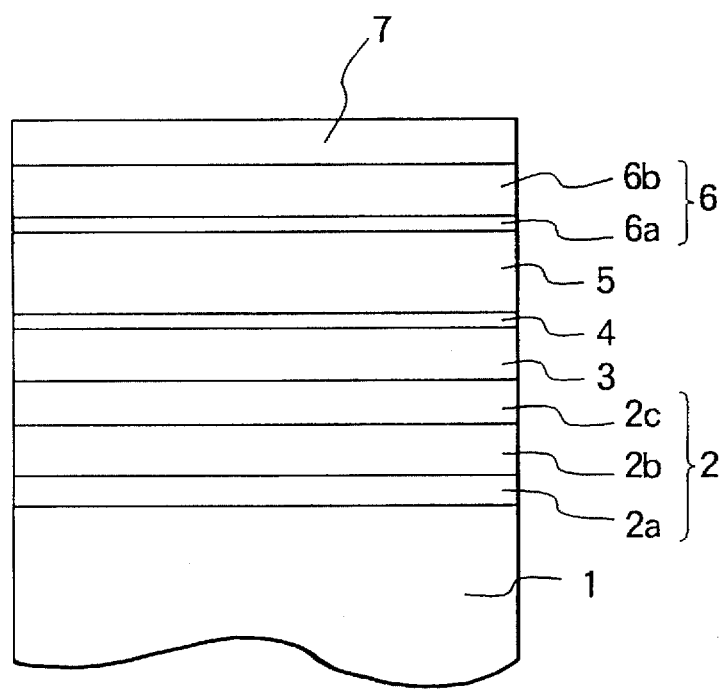
FIG. 4 is a schematic sectional view of a magnetic recording medium manufactured according to the present invention.

As shown in FIG. 4, Example 1 has a glass substrate 1 and an underlying lamina 2 on the glass substrate 1. On the underlying lamina 2, a first magnetic film 3, a nonmagnetic film 4, a second magnetic film 5, and a protection layer 6 are successively deposited in this order. In addition, a lubricant layer 7 is coated on the protection layer 6. The illustrated magnetic disk is manufactured through the following steps.

As mentioned before, a magnetic disk with reduced noise is obtained by interposing the nonmagnetic film 4 between the magnetic CoPt-based films 3 and 5 and which exhibits high coercive force. The magnetic disk is favorably combined with an MR head.

First, a glass substrate with a diameter of 2.5 inches is prepared which is composed of aluminosilicate glass chemically reinforced by means of ion exchange. Both the front and rear surfaces of the glass substrate are precisely polished to provide mirror surfaces each of which has a surface roughness (Ra) of about 50 angstroms.

As shown in FIG. 2, the above-mentioned glass substrate is mounted onto a substrate holder or pallet. The pallet 18 is fed to the pallet load chamber 11 of the in-line sputtering apparatus 10 illustrated in FIG. 1. Subsequently, the pallet load chamber 11 is exhausted from atmospheric pressure to a degree of vacuum which is similar to that of the sputtering chambers (vacuum chambers) 12. Thereafter, a partition wall 14 is opened to introduce the pallet 18 into a first one of the vacuum chambers (12a). In this first vacuum chamber 12a, the glass substrate mounted on the pallet 18 is heated by a lamp heater 19 at 300° C. for one minute. Then, the pallet 18 is transferred or transported at a transfer speed of 50 cm/min. and allowed to pass between the opposing pairs of the targets 15a and 15b which are kept in discharge states. The targets are aligned along the transfer direction of the pallet and are successively arranged in the order of target 15a for aluminum (Al) deposition and target 15b for chromium (Cr) deposition. Therefore, an underlying Al film 2a of 50 angstroms in thickness and an underlying Cr film 2b of 1000 angstroms in thickness are successively deposited on both the front and the rear surfaces of the glass substrate.

Next, the pallet 18 is transferred to a second one of the vacuum chambers (12b) through a port 21. The pallet 18 is heated again by a heater 20 located within the second vacuum chamber 12b. The heat treatment is carried out at 350° C. for 1 minute. Thereafter, the pallet 18 is moved at a transfer speed of 50 cm/min. between the pairs of targets 15c through 15g held in discharge states. In the second vacuum chamber 12b, targets 15c for CrMo, targets 15d for CoPtCr, targets 15e for CrMo, targets 15f for CoPtCr, and targets 15g for Cr are successively arranged in this order. The films are deposited in the order of the target arrangement. More specifically, deposition is made of an underlying CrMo film 2c of 100 angstroms in thickness, a first magnetic CoPtCr film 3 of 120 angstroms in thickness, a nonmagnetic CrMo film 4 of 50 angstroms in thickness, a second magnetic CoPtCr film 5 of 120 angstroms in thickness, and a first protection Cr layer 6a of 50 angstroms in thickness in this order The CrMo target 15c was composed of 98 at.% Cr and 2 at.% Mo, while the CrMo target 15e was composed of 95 at.% Cr and 5% Mo. In addition, the CrMo targets 15c and 15 3 were sputtered at a power of 500 watts.

The CoPtCr targets 15d and 15f were composed of 78 at.% Co, 11 at.% Pt, and 11 at.% Cr.

Furthermore, the vacuum chamber was finally exhausted to $5 \times 10^{-6}$ Torr and then Ar gas was introduced. Under the circumstances, sputtering was conducted at a pressure of $5 \times 10^{-3}$ Torr.

After completion of deposition based on sputtering, hydrophilication was conducted by washing the first protection Cr layer 6a with isopropyl alcohol (IPA). Thereafter, the substrate was dipped in an organic silicon compound solution (a solution of water, IPA and tetraethoxysilane) in which fine particles (particle size of 100 angstroms) of silica were dispersed. The resultant substrate was fired to form the second protection layer 6b of $SiO_2$.

Finally, the surface of the second protection layer 6b was dipped into a lubricant of perfluoropolyether to form the lubricant layer 7.

The magnetic disk so obtained was tested for coercive force, the product of residual magnetization and film thickness, and signal-to-noise ratio. The results are shown in Table 1 below. Table 1 also shows the difference $(d_{(002)} - d_{(110)})$ obtained by subtracting the crystal lattice spacing of BCC (110) planes in the nonmagnetic film 4 of a material based on Cr and Mo from the crystal lattice spacing of HCP (002) planes in the second magnetic film 5. As enumerated in Table 1, the distance is less than 0.030 angstrom.

COMPARATIVE EXAMPLE 1

Comparative Example 1 was prepared by manufacturing a magnetic disk in a manner similar to that of Example 1. However, Comparative Example 1 was manufactured by supplying both CrMo targets 15c and 15e with a sputtering power of 2000 watts. Similar tests were conducted and the results of the tests are shown in Table 1.

COMPARATIVE EXAMPLE 2

Comparative Example 2 was manufactured in a manner similar to that of Comparative Example 1. However, Cr targets were used in place of the CrMo targets 15c and 15e. Similar tests and their results are shown in Table 1.

EXAMPLES 2 THROUGH 4

Examples 2 through 4 were manufactured like Example 1. It is, however, noted that both CrMo targets 15c and 15e were supplied with sputtering power of 200 watts, 800 watts, and 1000 watts in Examples 2, 3, and 4, respectively.

Comparitive Examples 3 and 4

Comparative Examples 3 and 4 were manufactured by supplying both the CrMo targets 15c and 15e with sputtering power of 50 watts and 1500 watts, respectively.

EXAMPLES 5 THROUGH 7

Examples 5 through 7 were manufactured by the use of CrMoZr targets (Cr 90 at.%, Mo 8 at.T, and Zr 2 at.%) (Example 5), CrV targets (Cr 95 at.%, and V 5 at.%) (Example 7). Such targets were used in place of the CrMo targets 15e. Examples 5 through 7 had magnetic properties enumerated in Table 1.

EXAMPLES 8 THROUGH 11

Examples 8 through 11 were manufactured in a manner that was similar to that of Example 1 except that the CrMo target 15e wee composed of Cr 95 at.% and Mo 5 at.% (Example 8), Cr 90 at.% and Mo 10 at.% (Example 9), Cr 80 at.% and Mo 20 at.% (Example 10), and Cr 60 at.% and Mo 40 at.% (Example 11). Examples 8 through 11 were evaluated and had magnetic properties shown in Table 1.

EXAMPLES 12 THROUGH 18

Examples 12 through 18 were manufactured in a manner that was similar to that of Example 1 except that the targets as shown in the column "Note" of Table 1 were used in place of the CoPtCr targets 15d and 15f. Similar evaluation was made in conjunction with Examples 12 through 18.

TABLE 1

|  | Hc | Mr · δ | S/N ratio | $d_{(002)} - d_{(110)}$ | NOTE |
|---|---|---|---|---|---|
| Example 1 | 1900 | 0.97 | 33.7 | 0.030 | |
| Comparative Example 1 | 1950 | 1.00 | 29.5 | | Sputtering Power 200 watts |
| Comparative Example 2 | 1650 | 0.86 | 31.5 | | Nonmagnetic Cr film |
| Example 2 | 1900 | 0.95 | 27.8 | | Sputtering Power 50 watts |
| Example 3 | 1900 | 0.97 | 33.4 | 0.029 | Sputtering Power 200 watts |
| Example 3 | 1950 | 0.94 | 34.0 | 0.030 | Sputtering Power 800 watts |
| Example 4 | 2000 | 0.92 | 33.7 | 0.030 | Sputtering Power 1000 watts |
| Comparative Example 4 | 1800 | 0.82 | 29.1 | | Sputtering Power 1500 watts |
| Example 5 | 2050 | 0.97 | 35.0 | 0.020 | Cr 90, Mo 8, Zr 2 |
| Example 6 | 1850 | 0.95 | 33.3 | 0.032 | Cr 95, V 5 |
| Example 7 | 1800 | 0.95 | 33.3 | 0.019 | Cr 95, Ta 5 |
| Example 8 | 1950 | 1.00 | 33.8 | 0.030 | Cr 95, Mo 5 |
| Example 9 | 1950 | 0.97 | 33.7 | 0.019 | Cr 90, Mo 10 |
| Example 10 | 1900 | 0.97 | 33.9 | 0.006 | Cr 80, Mo 20 |
| Example 11 | 1730 | 0.92 | 32.3 | 0.002 | Cr 60, Mo 40 |
| Example 12 | 1880 | 1.10 | 32.7 | 0.031 | Co 85, Pt 10, Cr 5 |
| Example 13 | 2130 | 0.90 | 33.1 | 0.021 | Co 74, Pt 15, Cr 5 |
| Example 14 | 2130 | 0.68 | 34.3 | 0.018 | Co 71, Pt 12, Cr 17 |
| Example 15 | 2100 | 0.63 | 35.6 | 0.028 | Co 68, Pt 8, Cr 18, Ta 6 |
| Example 16 | 2020 | 0.91 | 35.1 | 0.027 | Co 72, Pt 10, Cr 14, Ta 4 |
| Example 17 | 1850 | 1.15 | 32.4 | 0.029 | Co 88, Pt 10, Ta 2 |
| Example 18 | 1910 | 0.97 | 32.0 | 0.031 | Co 83, Pt 12, Ta 5 |

[Units: Hc (Oe), Mr · δ (memu/cm$^2$), S/N ration (dB)]

As is apparent from Table 1, Comparative Example 1 exhibited a low signal-to-noise ratio and caused a large medium noise to occur. This is because the nonmagnetic film is deposited at high sputtering power.

In addition, Comparative Example 2 exhibited a low coercive force because the nonmagnetic film of Cr is deposited at high sputtering power.

According to Examples 1 through 18, the coercive force, the product of residual magnetization and film thickness, and the signal-to-noise ratio can be adjusted to more preferable values by means of changing the sputtering power, the material and composition of the nonmagnetic film, and those of the magnetic films.

EXAMPLES 19 THROUGH 21 AND COMPARATIVE EXAMPLES 5 AND 6

Examples 19 through 21 and Comparative Examples 5 and 6 were manufactured in a manner which was similar to that of Example 1 except that the CrMo targets 15c and 15e were driven by the sputtering power and the sputtering power density both of which were varied as indicated in the column "Note" of Table 2. Similar results are shown in Table 2.

TABLE 2

|  | Hc | Mr · δ | S/N ratio | $d_{(002)} - d_{(110)}$ | NOTE |
|---|---|---|---|---|---|
| Comparative Example 5 | 1900 | 0.95 | 28.8 |  | Sputtering Power Density 0.5 |
| Example 19 | 1900 | 0.96 | 30.5 | 0.029 | Sputtering Power Density 1.0 |
| Example 20 | 1900 | 0.97 | 33.7 | 0.030 | Sputtering Power Density 5.0 |
| Example 21 | 2000 | 0.95 | 32.9 | 0.030 | Sputtering Power Density 10 |
| Comparative Example 6 | 1800 | 0.82 | 29.1 |  | Sputtering Power Density 15 |

[Unit: Sputtering Power Density (W/cm$^2$)]

EXAMPLES 22 THROUGH 24 AND COMPARATIVE EXAMPLES 7 AND 8

Examples 22 through 24 and Comparative Examples 7 and 8 were manufactured by changing the deposition or sputtering rates as shown in Table 3 on sputtering the CrMo targets 15c and 15e. Such a change of the deposition rates can be accomplished by varying the sputtering power given to the CrMo targets 15c and 15e. The magnetic properties are shown in Table 3.

TABLE 3

|  | Hc | Mr · δ | S/N ratio | $d_{(002)} - d_{(110)}$ | NOTE |
|---|---|---|---|---|---|
| Comparative Example 7 | 1900 | 0.95 | 28.1 |  | Sputtering Rate 100 |
| Example 22 | 1900 | 0.96 | 32.2 | 0.030 | Sputtering Rate 180 |
| Example 23 | 2000 | 0.95 | 32.9 | 0.030 | Sputtering Rate 1000 |
| Example 24 | 1900 | 0.91 | 31.0 | 0.032 | Sputtering Rate 1400 |
| Comparative Example 8 | 1750 | 0.80 | 27.9 |  | Sputtering Rate 1600 |

[Unit: Sputtering Rate (angstrom/min.)]

TABLE 3A

| | Differences of Crystal Lattice Spacing $(d_{(002)} - d_{(110)})$ | |
|---|---|---|
| | Underlying Layer/ 1st Magnetic Film | Nonmagnetic Film/ 2nd Magnetic Film |
| Example 1 | 0.031 | 0.030 |
| Example 2 | 0.030 | 0.029 |
| Example 3 | 0.031 | 0.030 |
| Example 4 | 0.031 | 0.030 |

TABLE 3A-continued

| | Differences of Crystal Lattice Spacing $(d_{(002)} - d_{(110)})$ | |
|---|---|---|
| | Underlying Layer/ 1st Magnetic Film | Nonmagnetic Film/ 2nd Magnetic Film |
| Example 5 | 0.021 | 0.020 |
| Example 6 | 0.031 | 0.032 |
| Example 7 | 0.031 | 0.019 |
| Example 8 | 0.031 | 0.030 |
| Example 9 | 0.031 | 0.019 |
| Example 10 | 0.031 | 0.006 |
| Example 11 | 0.031 | 0.002 |
| Example 12 | 0.032 | 0.031 |
| Example 13 | 0.023 | 0.021 |
| Example 14 | 0.019 | 0.018 |
| Example 15 | 0.029 | 0.028 |
| Example 16 | 0.028 | 0.027 |
| Example 17 | 0.030 | 0.029 |
| Example 18 | 0.032 | 0.031 |
| Example 19 | 0.030 | 0.029 |
| Example 20 | 0.031 | 0.030 |
| Example 21 | 0.031 | 0.030 |
| Example 22 | 0.031 | 0.030 |
| Example 23 | 0.031 | 0.030 |
| Example 24 | 0.032 | 0.032 |

As are apparent from Tables 2 and 3, Examples 19 through 24 and Comparative Examples 5 through 8 show that the coercive force, the product of residual magnetization and film thickness, and the signal-to-noise ratio can be adjusted to preferable values by means of changing the sputtering power density and the sputtering rate. In all of the Examples above, it is to be noted that the difference ($d_{(002)} - d_{(110)}$) between crystal lattice spacing falls within a range from 0.002 to 0.032 angstroms.

Herein, the differences ($d_{(002)} - d_{(110)}$) between the nonmagnetic film 4 and the second magnetic film 5 have been shown in Tables 1 to 3 and may be called first differences. Herein, it is to be noted that $d_{(002)}$ represents a first crystal lattice plane spacing of (002) planes of a hexagonal close-packed (hcp) crystal structure in the second magnetic film 5 of Co and Pt, while $d_{(110)}$ represents a second crystal lattice plane spacing of (110) planes in the nonmagnetic film 4 of .Cr and Mo.

More specifically, such differences have been also measured in connection with the underlying layer 2c and the first magnetic film of each of Examples 1 through 24 and may be referred to as second differences. The second differences have been shown in the first column of Table 3A together with the second differences ($d_{(002)} - d_{(110)}$) shown in the second column of Table 3A. As readily understood from Table 3A, the second differences ($d_{(002)} - d_{(110)}$) between the underlying layer 2c and the first magnetic film of each of Examples 1 through 24 lie within a range between 0.002 and 0.032 angstrom like the first differences ($d_{(002)} - d_{(110)}$) between the nonmagnetic film 4 and the second magnetic film 5.

Thus, processing is made as regards Examples 1 to 24 so that both the first and the second differences ($d_{(002)} - d_{(110)}$) fall within the range between 0.002 and 0.032 angstrom. In other words, the low power sputtering mentioned above serves to render each of the first and the second differences within the above-mentioned range. Accordingly, the low power sputtering is effective to reduce variations of the first and the second differences within planes. This makes a distribution of the differences ($d_{(002)} - d_{(110)}$) uniform in planes and is helpful to make the quality of the films and the film structures uniform. In addition, it has been confirmed that Examples 1 through 24 have improved magnetic properties, as shown in Tables 1 through 3.

A magnetic recording medium according to a second embodiment of the present invention has a similar structure to the one illustrated in FIG. 4 although some differences are present between the first and the second embodiments, as will become clear later.

Example 25 was manufactured in the following manner as the magnetic recording medium according to this embodiment. The glass substrate 1 in Example 25 is composed of aluminosilicate glass and is precisely polished to provide mirror surfaces which have a surface roughness (Ra) of about 50 angstroms.

The underlying lamina 2 is composed of a thin Al film 2a of 50 angstroms in thickness, a thin Cr film 2b of 600 angstroms in thickness, and thin CrMo film 2c of 50 angstroms in thickness. The thin CrMo film 2c comprises Cr 98 at.% and Mo 2 at.%.

The first magnetic film 3 and the second magnetic film 5 are composed of the same material, i.e., a CoPtCr alloy (Co: 78 at.%, Pt: 11 at.%, and Cr: 11 at.%) and are each 120 angstroms in thickness.

The nonmagnetic film, namely, the nonmagnetic intermediate film 4 interposed between the first magnetic film 3 and the second magnetic film 5 is composed of a CrMo alloy (Cr: 98 at.%, and Mo 2 at.%) and has a thickness of 50 angstroms.

The protection layer 6 is composed of the first protection film 6a and the second protection film 6b which are successively stacked from the side of the substrate. The first protection film 6a is composed of a Cr film of 50 angstroms in thickness, and serves as a chemical protection film for the magnetic layer. The other protection film 6b is composed of a silicon oxide film of 160 angstroms in thickness has hard fine particles dispersed therein. This second protection film 6b provides wear resistance.

The lubricant layer 7 is composed of perfluoro-polyether so as to mitigate contact shock with a magnetic head.

A method of manufacturing the above-mentioned magnetic disk is described below.

The above-mentioned glass substrate is mounted onto a substrate holder (pallet). The pallet 18 is fed to the pallet load chamber 11 of the in-line sputtering apparatus 10 illustrated in FIG. 1. Subsequently, the pallet load chamber 11 is evacuated from the atmospheric pressure to a degree of vacuum similar to that of the sputtering chamber (vacuum chamber) 12. Thereafter, the partition wall 14 is opened to feed the pallet 18 into the first vacuum chamber 12a. In this first vacuum chamber 12a, the glass substrate mounted on the pallet 18 is heated with a lamp heater 19 at 300° C. for one minute. Then, the pallet 18 is transferred at a transfer speed of 1.2 m/min. and allowed to pass between the opposing pairs of the targets 15a and then between targets 15b which are kept in discharge states under an Ar gas pressure of 5 mTorr. The targets are arranged along the transfer direction of the pallet and are formed by the targets 15a for aluminum (Al) deposition and the targets 15b for chromium (Cr) deposition. Therefore, an underlying Al film 2a and an underlying Cr film 2b are successively deposited on both surfaces of the glass substrate in the order of the targets. The Al targets and Cr targets are supplied with 300 watts and 1.0 kilowatts, respectively, during sputtering.

Next, the pallet 18 is transferred to the second vacuum chamber 12b through the partition wall 21. The pallet 18 is heated again with a heater 20 located within the second vacuum chamber 12b. The heat treatment is carried out at 375° C. for 1 minute. Thereafter, the pallet 18 is transported at a transfer speed of 1.2 m/min. between the pairs of targets 15c through 15g kept in discharge states. Such discharge states can be maintained in Ar gas kept at a pressure of 1.3 mTorr. The second vacuum chamber 12b has an arrangement of targets 15c for CrMo, targets 15d for CoPtCr, targets 15e for CrMo, targets 15f for CoPtCr, and targets 15g for Cr which are located in this order. The films are deposited in the order of the target arrangement. More specifically, the underlying CrMo layer 2c, the first magnetic CoPtCr film 3, the nonmagnetic CrMo film 4, the second magnetic CoPtCr film 5, and the first protection Cr film 6a are successively deposited on the underlying Cr film 2b.

Sputtering was conducted with a power of 300 watts applied to the CoPtCr targets and 500 watts to the Cr targets. Furthermore, the vacuum chamber was finally exhausted to $5 \times 10^{-6}$ Torr and Ar gas was introduced to $5 \times 10^{-6}$ Torr. Under the circumstances, sputtering is carried out in the second vacuum chamber 12b.

After completion of deposition through sputtering, the first protection layer 6a and the second protection layer 6b are formed in the manner described above.

Finally, the lubricant layer 7 is formed on the second protection layer 6b like in the first embodiment.

The magnetic disk so obtained was subjected to operational tests with a floating distance kept at 0.075 μm or less. The results were good. In addition, the coercive force (Hc), the product (Mrδ) of residual magnetization and film thickness, and the signal-to-noise ratio were tested in connection with the above-mentioned magnetic disk. The results are shown in Table 4.

Furthermore, Table 4 also shows compositions and film thicknesses of the underlying CrMo layer 2c and of the nonmagnetic intermediate CrMo film 4, and the substrate heating temperature and Ar gas pressure upon formation of the underlying CrMo layer 2c and the nonmagnetic intermediate CrMo film 4. Moreover, differences ($d_{(002)} - d_{(110)}$) are also shown which are obtained by subtracting the crystal lattice spacing of the (110) planes in the underlying CrMo layer 2c (in contact with the magnetic CoPtCr film 3) from the crystal lattice spacing of the (002) planes in the magnetic CoPtCr film 3. In addition, differences ($d_{(002)} - d_{(110)}$) are enumerated which are obtained by subtracting the crystal lattice spacing of the (110) planes in the nonmagnetic intermediate CrMo film 4 from the crystal lattice spacing of the (002) planes in the magnetic CoPtCr film 5.

It is noted that the differences ($d_{(002)} - d_{(110)}$) obtained from the underlying CrMo layer 2c and the magnetic CoPtCr film 3 were identical with the differences ($d_{(002)} - d_{(110)}$) obtained from the nonmagnetic intermediate CrMo film 4 and the magnetic CoPtCr film 5. This is because the underlying layer 2c, the nonmagnetic intermediate film 4, the magnetic film 3, and the magnetic-film 5 were manufactured under the same conditions. Taking this into consideration, Table 4 thus shows only one of two values obtained for each example. Likewise, this is also true of Table 5.

The signal-to-noise ratio was measured by the use of a thin film head. Specifically, recording and reproduction outputs were measured at a track recording density of 110 kfci with a relative rate kept at 5.0 m/s between the thin film head and the disk and the magnetic head floating distance held at 0.060 μm. In addition, the noise spectrum of the magnetic disk was measured during signal recording and reproduction on this magnetic disk by a spectrum analyzer which had a carrier frequency and a measuring bandwidth set to 13.5 MHz and 27 MHz, respectively. The MR head used in the above-mentioned measurements had a recording track width of 4.2 μm, a reproduction track width of 3.5 μm, a recording gap length of 0.43 μm, and a reproduction gap length of 0.31 μm.

EXAMPLES 26 THROUGH 53

Examples 26 through 49 were manufactured in a manner which is similar to that of Example 25 except that process conditions were changed from those of Example 25 in connection with the compositions and the film thicknesses of the underlying CrMo layer 2c, those of the nonmagnetic intermediate CrMo film 4, the substrate heating temperature, and the Ar gas pressures upon formation of the underlying CrMo layer 2c and the nonmagnetic intermediate CrMo film 4, as enumerated in Table 4. In addition, Examples 50 through 53 were similar to those of the other examples except that the underlying CrMo layer 2c and the nonmagnetic intermediate CrMo film 4 were formed by CrMoZr alloy and had film thicknesses of 50 angstroms, and that the composition of each layer was changed from the other examples, as shown in Table 5.

The magnetic disks according to Examples 26 through 53 were subjected to operational tests with the floating distance kept at 0.075 μm or less. In addition, the coercive force (Hc), the product (Mrδ) of residual magnetization and film thickness, and the signal-to-noise ratio were also measured in connection with Examples 26 through 53. The signal-to-noise ratio was measured in the same manner as in Example 25. All of the test results are shown in Tables 4 and 5.

Furthermore, Tables 4 and 5 also show the compositions and the film thicknesses of the underlying CrMo layer 2c, those of the nonmagnetic intermediate CrMo film 4, the substrate heating temperature and the Ar gas pressure during formation of the underlying CrMo layer 2c and the nonmagnetic intermediate CrMo film 4, and the differences $(d_{(002)}-d_{(110)})$ obtained by subtracting the crystal lattice spacing of the (110) planes in the underlying CrMo layer 2c from the crystal lattice spacing of the (002) planes in the magnetic CoPtCr film 3, and the differences $(d_{(002)}-d_{(110)})$ obtained by subtracting the crystal lattice spacing of the (110) planes in the nonmagnetic intermediate CrMo film 4 from the crystal lattice spacing of the (002) planes in the magnetic CoPtCr film 5. At any rate, the above-mentioned differences in all of Examples fall within a range between 0.002 and 0.032 angstrom. This applies to the following examples.

TABLE 4-1

| Examples | Magnetic Layer Composition (at.%) 120 angstroms × two layers | Underlying Layer 2c Composition (at.%) | Underlying Layer 2c Film Thickness (Angstrom) | Nonmagnetic Intermediate Layer 4 Composition (at.%) | Nonmagnetic Intermediate Layer 4 Film Thickness (Angstrom) |
|---|---|---|---|---|---|
| 25 | Co78Pt11Cr11 | Cr98Mo2 | 50 | Cr98Mo2 | 50 |
| 26 | " | " | 100 | " | " |
| 27 | " | " | 50 | " | " |
| 28 | " | " | " | " | " |
| 29 | " | Cr95Mo5 | 50 | Cr95Mo5 | " |
| 30 | " | " | 100 | " | " |
| 31 | " | " | 20 | " | " |
| 32 | " | " | 50 | " | 20 |
| 33 | " | " | " | " | 50 |
| 34 | " | " | " | " | " |
| 35 | " | Cr90Mo10 | 50 | Cr90Mo10 | 50 |
| 36 | " | " | 100 | " | " |
| 37 | " | " | 20 | " | " |
| 38 | " | " | 50 | " | 20 |
| 39 | " | " | " | " | 50 |
| 40 | " | " | " | " | " |
| 41 | " | Cr85Mo15 | 50 | Cr85Mo15 | 50 |
| 42 | " | " | 100 | " | " |

TABLE 4-2

| Examples | Substrate Heating Temperature (°C.) | Ar Gas Pressure (mTorr) | Hc(Oe) | Mrδ (memu/cm²) | S/N Ratio (dB) | $d_{(002)}-d_{(110)}$ (Angstrom) |
|---|---|---|---|---|---|---|
| 25 | 375 | 1.3 | 1950 | 0.97 | 35.7 | +0.029 |
| 26 | " | " | 2000 | 0.94 | 35.9 | +0.028 |
| 27 | 300 | " | 1850 | 0.95 | 35.0 | +0.032 |
| 28 | 375 | 5.0 | 1900 | 0.96 | 35.3 | +0.032 |
| 29 | 375 | 1.3 | 2050 | 1.00 | 37.1 | +0.026 |
| 30 | " | " | 2100 | 0.96 | 37.3 | +0.25 |
| 31 | " | " | 2000 | 0.94 | 37.0 | +0.027 |
| 32 | " | " | 2000 | 1.00 | 37.1 | +0.026 |
| 33 | 300 | " | 1950 | 0.96 | 36.3 | +0.029 |
| 34 | 375 | 5.0 | 1950 | 0.97 | 36.3 | +0.030 |
| 35 | 375 | 1.3 | 2000 | 1.0 | 36.7 | +0.015 |
| 36 | " | " | 2050 | 0.96 | 36.9 | +0.014 |
| 37 | " | " | 2000 | 0.93 | 36.8 | +0.016 |
| 38 | " | " | 2000 | 1.00 | 36.7 | +0.015 |
| 39 | 300 | " | 1950 | 0.97 | 36.5 | +0.019 |

TABLE 4-2-continued

| Examples | Substrate Heating Temperature (°C.) | Ar Gas Pressure (mTorr) | Hc(Oe) | Mrδ (memu/ cm$^2$) | S/N Ratio (dB) | $d_{(002)}-d_{(110)}$ (Angstrom) |
|---|---|---|---|---|---|---|
| 40 | 375 | 5.0 | 1950 | 0.96 | 36.3 | +0.021 |
| 41 | 375 | 1.3 | 1950 | 0.99 | 35.5 | +0.007 |
| 42 | " | " | 2000 | 1.02 | 35.6 | +0.008 |

TABLE 5-1

| Examples | Magnetic Layer Composition (at.%) 120 angstroms × two layers | Underlying Layer 2c Composition (at.%) | Underlying Layer 2c Film Thickness (Angstrom) | Nonmagnetic Intermediate Layer 4 Composition (at.%) | Nonmagnetic Intermediate Layer 4 Film Thickness (Angstrom) |
|---|---|---|---|---|---|
| 43 | Co78Pt11Cr11 | Cr85Mo15 | 20 | Cr85Mo15 | 50 |
| 44 | " | " | 50 | " | 20 |
| 45 | " | " | " | " | 50 |
| 46 | " | " | " | " | " |
| 47 | " | Cr80Mo20 | 50 | Cr80Mo20 | 50 |
| 48 | " | " | " | " | " |
| 49 | " | " | " | " | " |
| 50 | " | Cr95Mo2Zr3 | " | Cr95Mo2Zr3 | " |
| 51 | " | Cr92Mo6Zr2 | " | Cr92Mo6Zr2 | " |
| 52 | " | Cr88Mo8Zr4 | " | Cr88Mo8Zr4 | " |
| 53 | " | Cr83Mo12Zr5 | " | Cr83Mo12Zr5 | " |

TABLE 5-2

| Examples | Substrate Heating Temperature (°C.) | Ar Gas Pressure (mTorr) | Hc(Oe) | Mrδ (memu/ cm$^2$) | S/N Ratio (dB) | $d_{(002)}-d_{(110)}$ (Angstrom) |
|---|---|---|---|---|---|---|
| 43 | 375 | 1.3 | 1950 | 0.95 | 35.5 | +0.007 |
| 44 | " | " | 1950 | 0.99 | 35.5 | +0.007 |
| 45 | 300 | " | 1850 | 0.97 | 35.1 | +0.013 |
| 46 | 375 | 5.0 | 1900 | 0.96 | 35.2 | +0.011 |
| 47 | 375 | 1.3 | 1950 | 0.97 | 35.3 | +0.002 |
| 48 | 300 | " | 1850 | 1.02 | 35.1 | +0.005 |
| 49 | 375 | 5.0 | 1900 | 0.99 | 35.2 | +0.004 |
| 50 | " | 1.3 | 2070 | 1.02 | 37.8 | +0.028 |
| 51 | " | " | 2150 | 1.01 | 38.3 | +0.025 |
| 52 | " | " | 2150 | 1.05 | 38.0 | +0.021 |
| 53 | " | " | 2100 | 1.00 | 37.8 | +0.016 |

As are apparent from Tables 4 and 5, Examples 25 through 49 with the underlying layer 2c and the nonmagnetic intermediate film 4 were composed of CrMo alloy and are excellent in coercive force (Hc), the product (Mrδ) of residual magnetization and film thickness, and the signal-to-noise ratio. Examples 50 through 53 which have the underlying layer 2c of CrMoZr alloy and the nonmagnetic intermediate film 4 of CrMoZr alloy are also excellent in coercive force (Hc), the product (Mrδ) of residual magnetization and film thickness, and the signal-to-noise ratio. In particular, it has been found out that addition of Zr to the CrMo alloy is helpful to further reduce noise and to improve the signal-to-noise ratio. To achieve such an effect, the content of Zr is preferably selected in a range between 2 and 5 at.%.

Examples 25 through 53 indicate that the differences $(d_{(002)}-d_{(110)})$ which represent relationships of the crystal lattice spacings between the underlying CrMo layer 2c and the magnetic CoPtCr film 3 and between the nonmagnetic intermediate CrMo film 4 and the magnetic CoPtCr film 5 can be changed in dependency upon the compositions of the underlying layer 2c, the compositions of the nonmagnetic intermediate film 4, the substrate heating temperature, and the Ar gas pressure.

For example, Examples 25 through 53 to which a small amount of Mo were added, were excellent in the signal-to-noise ratio.

These results indicate that the content of Mo in the CrMo alloy used in the underlying layer 2c and the nonmagnetic intermediate film 4 is preferably restricted within a range between 2 and 20 at.% and serves to restrict the differences $(d_{(002)}-d_{(110)})$ to the predetermined range mentioned above.

EXAMPLES 54 TO 70

Examples 54 to 70 were manufactured in a manner which is similar to that of Example 25 except that the combination of the compositions of the underlying CrMo layer and the nonmagnetic intermediate CrMo film 4 was changed as shown in Table 6.

As in Examples 25 to 53, similar operational tests and measurements were carried out in connection with Examples 54 to 70 also. It has been confirmed that Examples 54 to 70 have excellent properties like the other examples mentioned above, as shown in Table 6.

TABLE 6-1

| Examples | Magnetic Layer Composition (at.%) 120 angstroms × two layers | Underlying Layer 2c Composition (at.%) | Underlying Layer 2c Film Thickness (Angstrom) | Nonmagnetic Intermediate Layer 4 Composition (at.%) | Nonmagnetic Intermediate Layer 4 Film Thickness (Angstrom) |
|---|---|---|---|---|---|
| 54 | Co78Pt11Cr11 | Cr98Mo2 | 50 | Cr98Mo2 | 50 |
| 55 | " | " | " | Cr90Mo10 | " |
| 56 | " | ' | ' | Cr80Mo20 | " |
| 57 | " | Cr95Mo5 | " | Cr98Mo2 | " |
| 58 | " | " | " | Cr90Mo10 | " |
| 59 | " | " | " | Cr85Mo15 | " |
| 60 | " | " | " | Cr80Mo20 | " |
| 61 | " | Cr90Mo10 | " | Cr98Mo2 | " |
| 62 | " | " | " | Cr95Mo5 | " |
| 63 | " | " | " | Cr85Mo15 | " |
| 64 | " | " | " | Cr80Mo20 | " |
| 65 | " | Cr85Mo15 | " | Cr98Mo2 | " |
| 66 | " | " | " | Cr95Mo5 | " |
| 67 | " | " | " | Cr90Mo10 | " |
| 68 | " | Cr80Mo20 | " | Cr95Mo5 | " |
| 69 | " | " | " | Cr90Mo10 | " |
| 70 | " | " | " | Cr85Mo15 | " |

TABLE 6-2

| Examples | Substrate Heating Temperature (°C.) | Ar Gas Pressure (mTorr) | Hc(Oe) | Mrδ (memu/cm$^2$) | S/N Ratio (dB) | $d_{(002)}-d_{(110)}$ (Angstrom) between First Magnetic Layer 3 and Underlying Layer 2c | $d_{(002)}-d_{(110)}$ (Angstrom) between Second Magnetic Layer 5 and Nonmagnetic Intermediate Layer 4 |
|---|---|---|---|---|---|---|---|
| 54 | 375 | 1.3 | 1950 | 0.97 | 35.8 | +0.029 | +0.026 |
| 55 | " | " | 2000 | 0.97 | 35.7 | " | +0.015 |
| 56 | " | " | 1900 | 0.95 | 35.1 | " | +0.002 |
| 57 | " | " | 2050 | 0.98 | 36.0 | +0.026 | +0.029 |
| 58 | " | " | 2050 | 1.00 | 37.1 | " | +0.015 |
| 59 | " | " | 1950 | 1.00 | 36.5 | " | +0.007 |
| 60 | " | " | 1950 | 1.02 | 36.0 | " | +0.002 |
| 61 | " | " | 1950 | 0.98 | 36.1 | +0.015 | +0.029 |
| 62 | " | " | 2000 | 1.00 | 37.0 | " | +0.026 |
| 63 | " | " | 2000 | 0.99 | 36.2 | " | +0.007 |
| 64 | " | " | 2000 | 1.01 | 36.0 | " | +0.002 |
| 65 | " | " | 1900 | 1.00 | 35.0 | +0.007 | +0.029 |
| 66 | " | " | 1950 | 0.99 | 35.8 | " | +0.026 |
| 67 | " | " | 1950 | 0.98 | 35.5 | " | +0.015 |
| 68 | " | " | 1900 | 0.97 | 35.5 | +0.002 | +0.026 |
| 69 | " | " | 1900 | 0.96 | 35.4 | " | +0.015 |
| 70 | " | " | 1950 | 0.98 | 35.2 | " | +0.007 |

As is apparent from Table 6, the coercive force (Hc), the product (Mrδ) of residual magnetization and film thickness, and the signal-to-noise ratio were improved when the underlying CrMo layer 2c which includes 2 to 20 at.% of Mo is combined with the nonmagnetic intermediate CrMo film 4. Practically, improvement of the signal-to-noise ratio has been achieved by a combination of the underlying CrMo layer including 2 to 20 at.% of Mo with the nonmagnetic intermediate CrMo film including S to 10 at.% of Mo and another combination of the nonmagnetic intermediate CrMo film including 2 to 20 at.% of Mo with the underlying CrMo layer including 5 to 10 at.% of Mo. In addition, the most preferable combination for improving the signal-to-noise ratio has been found to be a combination of the underlying CrMo layer including 5 to 10 at.% of Mo with the nonmagnetic intermediate CrMo film including 5 to 10 at.% of Mo.

EXAMPLES 71 THROUGH 88

Examples 71 through 80 were similar in structure to Example 25 except that the composition of the magnetic film 3, the composition of the underlying CrMo layer 2c, and the composition of the nonmagnetic intermediate CrMo film 4 were modified in Examples 71 through 80, as shown in Table 7.

Likewise, Examples 81 through 88 were different from Example 25 in view of the fact that the composition and the material of the magnetic film 3, the composition of the underlying CrMo layer 2c, and the composition of the nonmagnetic intermediate CrMo film 4 were varied in Examples 81 to 88, as shown in Table 7.

The magnetic disks according to Examples 71 to 88 were tested and measured as in the other examples mentioned above. The test results and the measurement results of Examples 71 to 88 are shown in Table 7 and are improved.

It is noted that, in Table 4, the difference $(d_{(002)}-d_{(110)})$ obtained by subtracting the crystal lattice spacing of the (110) planes in the underlying CrMo layer 2c from the crystal lattice spacing of the (002) planes in the magnetic CoPtCr film 3 was equal to the difference $(d_{(002)}-d_{(110)})$ obtained by subtracting the crystal lattice spacing of the (110) planes in the nonmagnetic intermediate CrMo film 4 from the crystal lattice spacing of the (002) planes in the magnetic CoPtCr film 5. This is because the underlying layer 2c, the nonmagnetic intermediate film 4, the magnetic film 3, and the magnetic film 5 were deposited under the same conditions. Taking this into deration, Table 7 shows only one of two values ned for each example.

TABLE 7-1

| Examples | Magnetic Layer Composition (at %) 120 angstroms × two layers | Underlying Layer 2c Composition (at. %) | Underlying Layer 2c Film Thickness (Angstrom) | Nonmagnetic Intermediate Layer 4 Composition (at. %) | Nonmagnetic Intermediate Layer 4 Film Thickness (Angstrom) |
|---|---|---|---|---|---|
| 71 | Co84Pt5Cr11 | Cr95Mo5 | 50 | same as underlying layer 2c | 50 |
| 72 | " | Cr90Mo10 | " | same as underlying layer 2c | " |
| 73 | Co71Pt18Cr11 | Cr95MO5 | " | same as underlying layer 2c | " |
| 74 | " | Cr90Mo10 | " | same as underlying layer 2c | " |
| 75 | Co84Pt11Cr5 | Cr95Mo5 | " | same as underlying layer 2c | " |
| 76 | " | Cr90Mo10 | " | same as underlying layer 2c | " |
| 77 | Co74Pt11Cr15 | Cr95Mo5 | " | same as underlying layer 2c | " |
| 78 | " | Cr90Mo10 | " | same as underlying layer 2c | " |
| 79 | Co64Pt11Cr25 | Cr95Mo5 | " | same as underlying layer 2c | " |
| 80 | " | Cr90Mo10 | " | same as underlying layer 2c | " |
| 81 | Co87Pt11Ta2 | Cr95Mo5 | " | same as underlying layer 2c | " |
| 82 | " | Cr90Mo10 | " | same as underlying layer 2c | " |
| 83 | Co76Pt11Cr11Ta2 | Cr95Mo5 | " | same as underlying layer 2c | " |
| 84 | " | Cr90Mo10 | " | same as underlying layer 2c | " |
| 85 | Co76Pt11Cr11Ta2 | Cr95Mo5 | " | same as underlying layer 2c | " |
| 86 | " | Cr90Mo10 | " | same as underlying layer 2c | " |
| 87 | Co73Pt11Cr11Ta5 | Cr95Mo5 | " | same as underlying layer 2c | " |
| 88 | " | Cr90Mo10 | " | same as underlying layer 2c | " |

TABLE 7-2

| Examples | Substrate Heating Temperature (°C.) | Ar Gas Pressure (mTorr) | Hc(Oe) | Mrδ (memu/cm$^2$) | S/N Ratio (dB) | $d_{(002)} - d_{(110)}$ (Angstrom) |
|---|---|---|---|---|---|---|
| 71 | 375 | 1.3 | 1850 | 1.09 | 35.5 | +0.001 |
| 72 | " | " | 1850 | 1.10 | 35.1 | +0.003 |
| 73 | " | " | 2250 | 0.88 | 35.6 | +0.032 |
| 74 | " | " | 2300 | 0.89 | 36.5 | +0.24 |
| 75 | " | " | 1900 | 1.09 | 35.8 | +0.031 |
| 76 | " | " | 1950 | 1.10 | 36.3 | +0.022 |
| 77 | " | " | 2150 | 0.95 | 36.5 | +0.020 |
| 78 | " | " | 2200 | 0.94 | 35.6 | +0.010 |
| 79 | " | " | 2300 | 0.82 | 35.9 | +0.013 |
| 80 | " | " | 2350 | 0.82 | 35.1 | +0.003 |
| 81 | " | " | 1900 | 1.10 | 34.3 | +0.028 |
| 82 | " | " | 1950 | 1.11 | 34.9 | +0.020 |
| 83 | " | " | 1950 | 1.01 | 34.1 | +0.032 |
| 84 | " | " | 1950 | 1.10 | 34.8 | +0.024 |
| 85 | " | " | 2050 | 0.91 | 37.0 | +0.028 |
| 86 | " | " | 2000 | 0.91 | 36.8 | +0.018 |
| 87 | " | " | 2100 | 0.75 | 35.5 | +0.030 |
| 88 | " | " | 2050 | 0.76 | 35.8 | +0.021 |

As is apparent from Table 7, a high Hc and a high signal-to-noise ratio can be achieved when the underlying layer 2c and the nonmagnetic intermediate film 4 are each composed of the CrMo alloy including 5 to 10 at.% of Mo and the magnetic film is composed of the CoPtCr alloy (Examples 71 through 80) including 60 to 90 at.% of Co, 4 to 20 at.% of Pt, and 3 to 30 at.% of Cr.

Further improvement of Hc and the signal-to-noise ratio can be achieved by the use of the magnetic CoPtCr alloy film which includes 64 to 84 at.% of Co, 5 to 18 at.% of Pt, and 5 to 25 at.% of Cr.

When the magnetic layer is composed of the CoPtTa alloy (Examples 71 through 84), a high Hc and a high signal-to-noise ratio can be achieved by inclusion of 80 to 90 at.% of Co, 5 to 15 at.% of Pt, and 1 to 7 at.% of Ta.

When the magnetic film is composed of the CoPtCrTa alloy (Examples 85 through 88), a high Hc and a high signal-to-noise ratio can be achieved by inclusion of 70 to 80 at.% of Co, 5 to 15 at.% of Pt, 5 to 25 at.% of Cr, and 1 to 7 at.% of Ta.

According to the results of the tests conducted by the present inventors, Examples enumerated in Tables 4 through 7 were found to be improved in over-writing properties.

In the method of manufacturing magnetic recording media according to the present invention, the underlying layer and the nonmagnetic intermediate films contacted with the magnetic films contain less impurities and contaminants and, as a result, enable improvement of the magnetic properties, such as the coercive force, the reproduction output, and the signal-to-noise ratio. In addition, the properties for the magnetic recording media can further be improved by reducing distribution of the difference ($d_{(002)} - d_{(110)}$) between the crystal lattice spacing described in the above.

What is claimed is:

1. A method of manufacturing a magnetic recording medium by using a sputtering apparatus of an inline type, said magnetic recording medium comprising a substrate, an underlying layer on said substrate, and a magnetic layer which is deposited on said underlying layer and which has a first magnetic film comprising Co and Pt, a nonmagnetic intermediate film including Cr, and a second magnetic film comprising Co and Pt, said underlying layer comprising a surface film in contact with said magnetic layer, said method comprising the step of:

depositing at least one of the surface film and the nonmagnetic film at a sputtering current density between 0.9 and 10 W/cm², both inclusive, within said sputtering apparatus of the in-line type.

2. A method as claimed in claim 1, wherein at least one of the surface film and the nonmagnetic film is deposited at a deposition rate between 150 and 1500 angstroms/min.

3. A method as claimed in claim 2, wherein at least one of the surface film and the nonmagnetic film is deposited at a deposition rate between 450 and 1000 angstroms/min.

4. A method as claimed in claim 1, wherein the nonmagnetic intermediate film is composed of an alloy selected from a group consisting of an alloy of Cr and Mo, an alloy of Cr and V, and an alloy of Cr and Ta.

5. A method as claimed in claim 1, wherein at least one of the first and the second magnetic films is composed of an alloy selected from a group consisting of an alloy of CoPtCr, an alloy of CoPtTa, an alloy of CoPtCrTa, CoPtCrB, CoPtCrNi.

6. A method as claimed in claim 1, further comprising the steps of:

depositing a protection layer on said second magnetic film in the sputtering apparatus of the in-line type.

7. A method as claimed in claim 6, wherein the protection layer is formed by one of Cr and an alloy of Cr.

8. A method as mentioned in claim 1, each of the first and the second magnetic films being characterized by a hexagonal close-packed (hcp) crystal structure having (002) planes spaced from each other by a first crystal lattice plane spacing $d_{(002)}$ while the nonmagnetic intermediate film is characterized by a bodycentered cubic (bcc) crystal structure having (110) planes spaced from each other by a second crystal lattice plane spacing $d_{(110)}$, said deposition step comprising the step of:

successively forming the nonmagnetic intermediate film and the second magnetic film within said low power range such that the difference between the first crystal lattice plane spacing $d_{(002)}$ and the second crystal lattice plane spacing $d_{(110)}$ falls within a range between 0.002 and 0.032 angstrom.

9. A method as claimed in claim 8, wherein the difference is within a range between 0.014 and 0.030 angstrom.

10. A method as claimed in claim 9, said magnetic layer further comprising an additional nonmagnetic intermediate film on said second magnetic film and a third magnetic film on said additional nonmagnetic intermediate film, the additional nonmagnetic film comprising Cr and Mo and being characterized by a bodycentered cubic (bcc) crystal structure having (110) planes spaced from each other by a second crystal lattice plane spacing $d_{(110)}$ while the third magnetic film comprises Co and Pt and is characterized by a hexagonal close-packed (hcp) crystal structure having (002) planes spaced from each other by a first crystal lattice plane spacing $d_{(002)}$, said method comprising the step of:

successively depositing the additional nonmagnetic intermediate film and the third magnetic film at a low power such that a difference between the first crystal lattice plane spacing $d_{(002)}$ and the second crystal lattice plane spacing $d_{(110)}$ falls within a range between 0.002 and 0.032 angstrom.

11. A method as claimed in claim 10, wherein the difference is within a range between 0.014 and 0.030 angstrom.

12. A method as claimed in claim 8, said magnetic recording medium further comprising a substrate and an underlying layer which is deposited on said substrate, said underlying layer comprising a surface film which is in contact with said first magnetic film and which comprises Cr and Mo, said surface film being characterized by a body-centered cubic (bcc) crystal structure having (110) planes spaced from each other by a third crystal lattice plane spacing $d_{(110)}$, said method comprising the step of:

successively depositing the surface film and the first magnetic film at a low power such that an additional difference between the first crystal lattice plane spacing $d_{(002)}$ and the third crystal lattice plane spacing $d_{(110)}$ falls within a range between 0.002 and 0.032 angstrom.

13. A method as claimed in claim 12, wherein the additional difference falls within a range between 0.014 and 0.030 angstrom.

14. A method as claimed in claim 8, said underlying layer further comprising an underlying film interposed between said substrate and said surface film, the method comprising the step of:

depositing, as said underlying film, a film of metal having a body-centered cubic (bcc) crystal structure.

15. A method as-claimed in claim 14, wherein said metal is Cr.

16. A method as claimed in claim 8, wherein said depositing step comprises the steps of:

preparing a substrate;

heating the substrate to a temperature between 250° C. and 425° C.;

introducing the magnetic layer into an argon gas atmosphere kept at a pressure between 0.5 and 10 mTorr; and carrying out sputtering to deposit the magnetic layer.

17. The method of manufacturing a magnetic recording medium as claimed in claim 1, wherein deposition of said at least one of the surface film and the nonmagnetic film occurs within the range between 100 and 1000 watts.

18. A method as claimed in claim 1, wherein said low power range falls within a range between 300 and 700 watts.

19. A method of manufacturing a magnetic recording medium by using a sputtering apparatus of an in-line type, said magnetic recording medium comprising a substrate, an underlying layer on said substrate, and a magnetic layer which is deposited on said underlying layer and which has a first magnetic film comprising Co and Pt, a nonmagnetic intermediate film including Cr, and a second magnetic film comprising Co and Pt, said underlying layer comprising a surface film in contact with said magnetic layer, said method comprising the step of:

depositing at least one of the surface film and the nonmagnetic film at a sputtering current density between 0.9 and 10 w/cm², both inclusive, to a sputtering portion of the sputtering apparatus used for depositing said at least one of the surface film and the nonmagnetic film in order to improve coercive force and signal-to-noise ratio.

* * * * *